(12) United States Patent
Afshari et al.

(10) Patent No.: US 6,924,721 B2
(45) Date of Patent: Aug. 2, 2005

(54) GAS SEGREGATOR BARRIER FOR ELECTRICAL SWITCHING APPARATUS

(75) Inventors: Farhad Afshari, Bridgeville, PA (US);
David M. Olszewski, Coraopolis, PA (US); William E. Beatty, Jr., Beaver, PA (US); William M. Crooks, Sumter, SC (US); William M. Randal, Baldwin Township, PA (US); David K. Haag, Sumter, SC (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/619,030

(22) Filed: Jul. 14, 2003

(65) Prior Publication Data

US 2005/0012578 A1 Jan. 20, 2005

(51) Int. Cl.[7] ............................................... H01H 13/04
(52) U.S. Cl. ............................ 335/202; 218/157; 335/8
(58) Field of Search .......................... 335/6, 8–10, 132, 335/165–176, 201–202; 218/155–157

(56) References Cited

U.S. PATENT DOCUMENTS

| | | | |
|---|---|---|---|
| 4,019,005 A | * | 4/1977 | Michetti ..................... 218/149 |
| 4,142,225 A | | 2/1979 | Diersing et al. |
| 4,301,493 A | | 11/1981 | Schweikle et al. |
| 4,783,718 A | | 11/1988 | Raabe et al. |
| 4,965,544 A | | 10/1990 | Kelaita, Jr. et al. |
| 5,150,091 A | | 9/1992 | Hart et al. |
| 5,910,757 A | | 6/1999 | Broghammer et al. |
| 6,512,192 B1 | * | 1/2003 | Yee et al. ..................... 218/157 |

* cited by examiner

*Primary Examiner*—Lincoln Donovan
(74) *Attorney, Agent, or Firm*—Martin J. Moran (57) ABSTRACT

A gas segregator barrier is for quenching, segregating and controllably directing ionized gases discharged from a pair of spaced-apart circuit breakers double-branch mounted within a panelboard assembly. The spaced-apart circuit breakers include corresponding pairs of opposing poles, and a housing with exhaust vent openings for discharging ionized gases developed from an electrical fault. The gas segregator barrier includes at least substantially parallel segregator fins divided into first and second portions by a transverse dividing member. Baffles in the transverse dividing member quench the ionized gases and provide fluid communication between exhaust channels formed between the segregator fins of the first portion, and gas ducts disposed between the segregator fins of the second portion. The gas ducts include one or more lateral members structured to controllably direct the discharged ionized gases.

1 Claim, 6 Drawing Sheets

GAS SEGREGATOR BARRIER FOR ELECTRICAL SWITCHING APPARATUS

BACKGROUND OF THE INVENTION

1. Field of the Invention

The present invention relates generally to panelboard assemblies and, more particularly, to a panelboard assembly employing a gas segregator barrier for avoiding inadvertent flow of electrical current due to ionized exhaust gases being discharged from electrical switching apparatus therein. The invention also relates to gas segregator barriers for electrical switching apparatus.

2. Background Information

Panelboard assemblies are power distribution devices used in residential, industrial and commercial applications. Panelboards typically comprise a wall mounted box enclosure supporting conductive bus bars and electrical switching apparatus (e.g., without limitation, circuit switching devices and circuit interrupters such as circuit breakers, contactors, motor starters, motor controllers and other load controllers) electrically connected to the bus bars.

Panelboard assemblies often include pairs of adjacent circuit breakers connected in an end-opposing, "double-branch" arrangement, to bus bars carrying current of the same electrical phase. See, for example, U.S. Pat. Nos. 4,783,718; 4,965,544; and 5,150,091.

Circuit breakers typically have a molded plastic housing enclosing at least one pair of separable contacts. When the separable contacts are opened, under overload, short circuit or fault conditions, an arc is usually created which is accompanied by the generation of ionized gases. Such ionized gases are typically discharged through vents in the molded plastic housing and, when discharged from one of the closely aligned circuit breakers within the double-branch arrangement, could transfer to the other circuit breaker, resulting in a phase-to-phase electrical fault. The ionized gases could also cause a phase-to-ground failure with any metallic enclosure within which the circuit breaker is mounted. This can lead to electrical faults on the line side of the circuit breakers and damage to switchgear equipment.

To prevent electrical faults caused by conductive ionized gases, known prior art panelboard assemblies employ gas barriers.

Fiberboard barriers are often used to prevent ionized exhaust gases discharged from one circuit breaker from entering the line lug compartments of the opposing circuit breaker. However, over long periods of continuous use, the fiber material can become brittle and deteriorate. Additionally, because such fiberboard barriers are removable for access to the line terminals, subsequent connection of the circuit breakers to line terminal straps without replacing the barrier is possible, thus creating a path for ionized gases to potentially cause a phase-to-phase and/or phase-to-ground electrical fault.

U.S. Pat. No. 4,965,544 discloses a molded case circuit breaker exhaust barrier for direct attachment to the circuit breaker terminal straps in the absence of line terminal lugs. The barrier includes hinged extension baffles for insertion within the line strap compartments of adjacent circuit breakers connected within a panelboard in a double-branch arrangement. The extensions are inserted within openings formed in the case of the circuit breaker to electrically insulate the line strap connectors from ionized exhaust gases. Although the disclosed barrier insulates the line strap connectors, discharged ionized gases are not segregated or controllably directed.

U.S. Pat. No. 5,150,091 discloses lug and bus covers for molded case circuit breakers to electrically insulate line and load straps. An integrally formed baffle and press-fit retention arrangement requires no separate fastening mechanism for attachment to the ends of an industrial-rated circuit breaker. A bus cover attaches to the line ends of opposing circuit breakers connected within a panelboard in double-branch configuration to prevent exhaust gases from one circuit breaker, experiencing a severe overcurrent fault condition in one phase of a multi-phase power system, from reaching the other phase connections within the opposing circuit breaker. However, the disclosed lug and bus covers are separate units requiring attachment to each end of each circuit breaker within the panelboard assembly.

There is a need, therefore, for a simplified, single gas segregator barrier integral with the panelboard assembly and capable of quenching and controllably directing discharged ionized gases.

Accordingly, there is room for improvement in gas segregator barriers for electrical switching apparatus and in panelboard assemblies employing ionized gas segregator barriers.

SUMMARY OF THE INVENTION

These needs and others are satisfied by the present invention, which is directed to a gas segregator barrier for electrical switching apparatus of a panelboard assembly. The barrier quenches and controllably directs ionized gases discharged from exhaust vent openings in the electrical switching apparatus, in order to minimize electrical faults associated therewith.

As one aspect of the invention, a gas segregator barrier for electrical switching apparatus including a housing having at least one exhaust vent opening for discharging ionized gases which are developed in response to an electrical fault, comprises: a plurality of at least substantially parallel segregator fins; a transverse dividing member structured to divide the substantially parallel segregator fins into a first portion and a second portion; a plurality of exhaust channels formed between the substantially parallel segregator fins of the first portion; a plurality of gas ducts disposed between the substantially parallel segregator fins of the second portion; and a plurality of baffles in the dividing member structured to quench the discharged ionized gases and to provide fluid communication between the exhaust channels of the first portion and the gas ducts of the second portion.

The gas ducts may include at least one lateral member extending between and integral with the at least substantially parallel segregator fins of the second portion and structured to controllably direct the discharged ionized gases.

As another aspect of the invention, a panelboard assembly comprises: a switchgear cabinet including means for mounting electrical switching apparatus; a pair of spaced-apart electrical switching apparatus mounted to the switchgear cabinet by the means for mounting, each of the electrical switching apparatus including a housing having at least one exhaust vent opening for discharging ionized gases which are developed in response to an electrical fault; and a gas segregator barrier disposed between the pair of spaced-apart electrical switching apparatus. The gas segregator barrier comprises: a plurality of at least substantially parallel segregator fins, a transverse dividing member structured to divide the substantially parallel segregator fins into a first portion and a second portion, a plurality of exhaust channels formed between the substantially parallel segregator fins of the first portion, with each of the exhaust channels being proximate a pair of the at least one exhaust vent opening for the pair of spaced-apart electrical switching apparatus, a plurality of gas ducts disposed between the substantially parallel segregator fins of the second portion, and a plurality of baffles in the dividing member structured to quench the discharged ionized gases and to provide fluid communication between the exhaust channels of the first portion and the gas ducts of the second portion.

The switchgear cabinet may further include a support wall and a plurality of at least substantially parallel elongated bus bars supported by the support wall, with each of the elongated bus bars carrying a current of a different electrical phase. The spaced-apart electrical switching apparatus may be electrically connected to the bus bars by a plurality of branch strap connectors.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

For purposes of illustration, the present invention will be described as applied to a panelboard assembly including one or more pairs of spaced-apart, three-pole circuit breakers, although it will become apparent that it could also be applied to other electrical power applications including other types of electrical switching apparatus such as, for example, load centers or similar power distribution devices used in residential, industrial and commercial applications and including electrical switching apparatus such as, for example, circuit switching devices, and other circuit interrupters such as contactors, motor starters, motor controllers, and other load controllers having one or more poles.

As employed herein, the term "ionized" means completely or partially converted into ions and being electrically conductive such as, for example, ionized gases generated in response to an electrical fault.

As employed herein, the term "switchgear cabinet" refers to the cabinet of a power distribution system such as, for example, a panelboard or load center which is structured to secure electrical switching apparatus, expressly including, but not limited to, circuit breakers.

As employed herein, the term "double-branch" refers to a configuration of electrical switching apparatus within a switchgear cabinet, such as a pair of spaced-apart circuit breakers each having a plurality of poles, with each of the poles of one of the spaced-apart circuit breakers having a corresponding opposing one of the poles on the other one of the spaced-apart circuit breakers, in order that each pair of corresponding opposing poles is electrically connected to an elongated bus bar carrying current of the same electrical phase.

Figure 1:
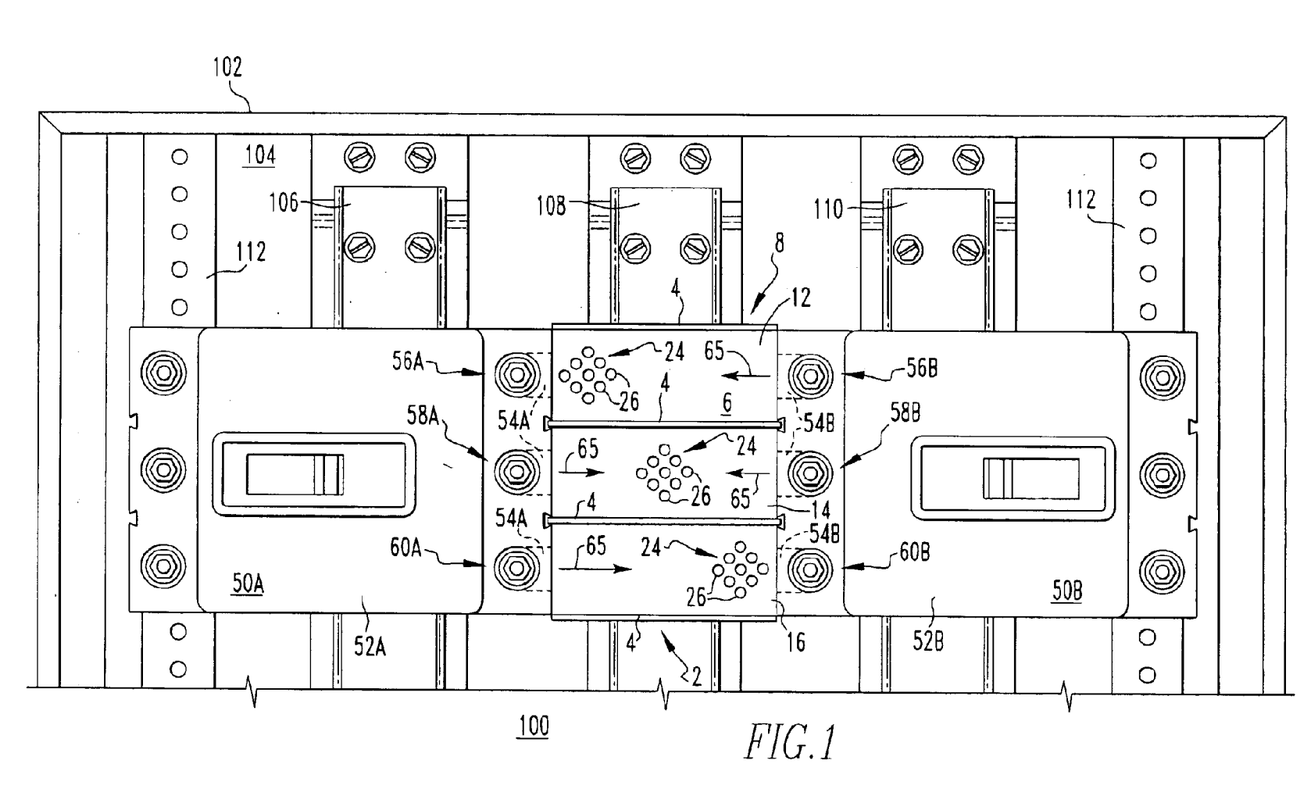
FIG. 1 is a vertical elevation view of a portion of a panelboard assembly and a gas segregator barrier in accordance with the present invention.

FIG. 1 illustrates a gas segregator barrier 2 for use with a panelboard assembly 100. As shown, the basic components of the panelboard assembly 100 include a switchgear cabinet 102 having a support wall 104, a plurality of substantially parallel elongated bus bars, for example, first, second and third elongated bus bars 106,108,110, suitably coupled to and electrically isolated from the support wall 104, one or more mounting rails 112 (two are shown in FIG. 1) and a pair of spaced-apart circuit breakers 50A,50B double-branch mounted within the panelboard assembly 100. In the example of FIG. 1, the spaced-apart circuit breakers 50A, 50B are three-pole circuit breakers. Each of the spaced-apart circuit breakers 50A,50B includes a plurality of poles, for example, first, second and third poles 56A,58A,60A of three-pole circuit breaker 50A, and first, second and third poles 56B,58B,60B of three-pole circuit breaker 50B. As shown, each of the poles 56A,58A,60A of circuit breaker 50A has a corresponding opposing one of the poles 56B, 58B,60B on the other circuit breaker 50B. Each of the circuit breakers 50A,50B includes a housing 52A,52B having a plurality of exhaust vent openings 54A,54B, respectively, for the corresponding poles 56A,56B, 58A,58B, 60A,60B thereof. The exhaust vent openings 54A,54B are structured to discharge ionized gases 65 from within the circuit breakers 50A,50B.

As is well known, the ionized gases 65 develop from arcs (not shown) resulting under certain overload, fault or short circuit conditions. It is desirable to prevent a phase-to-phase electrical failure between the opposing poles of a pair of double-branch mounted, spaced-apart circuit breakers (e.g., opposing first poles 56A and 56B of spaced-apart circuit breakers 50A,50B). Hence, the ionized gases 65 from one of the spaced-apart circuit breakers, for example circuit breaker 50A, experiencing a severe over current fault condition in one phase of a multi-phase power system should not be permitted to reach the other phase connections within the opposing spaced-apart circuit breaker, for example circuit breaker S0B. To eliminate such electrical faults, the gas segregator barrier 2, in accordance with the present invention, may be employed.

Figure 2:
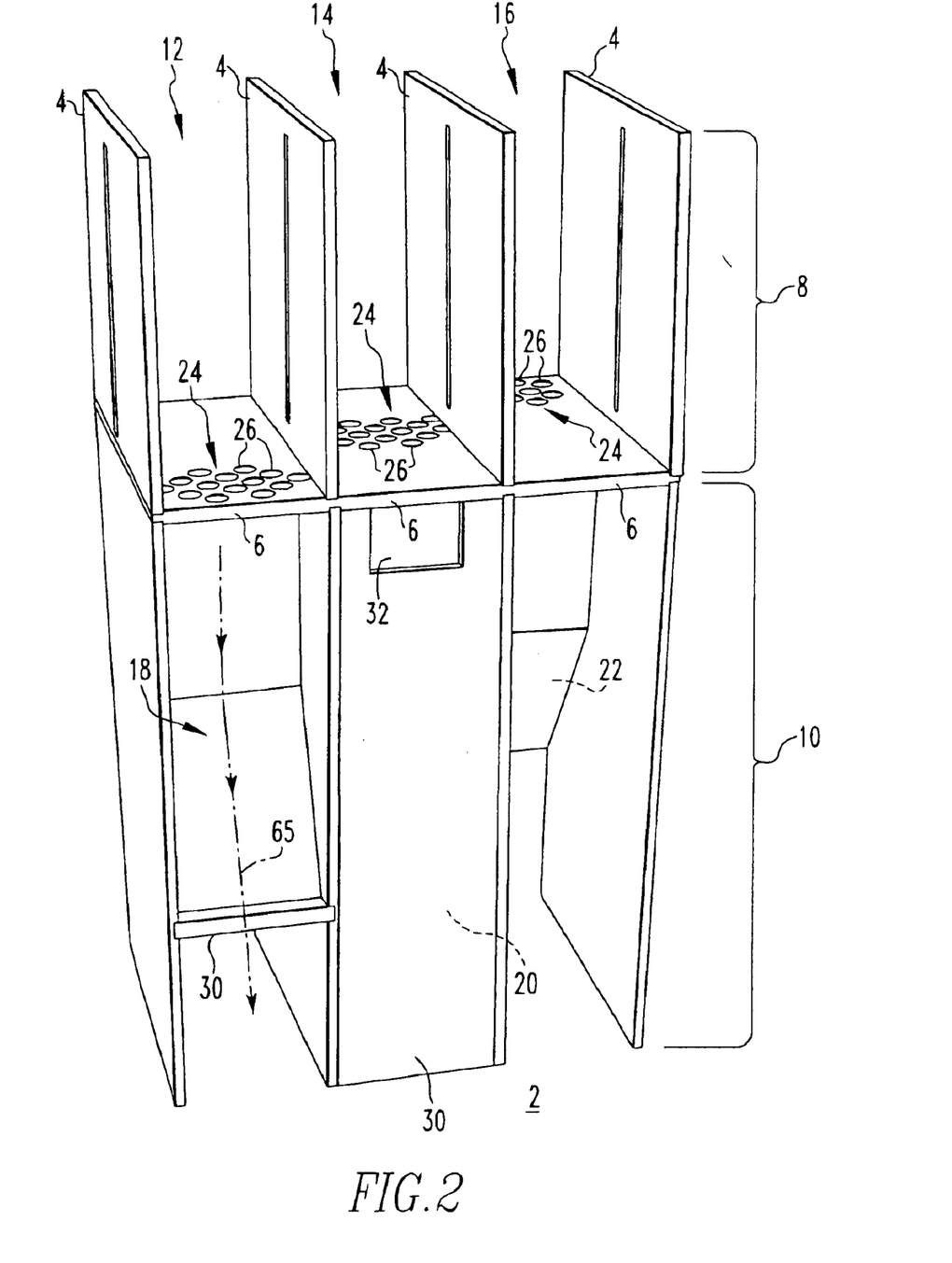
FIG. 2 is an isometric view of the gas segregator barrier of FIG. 1.

Continuing to refer to FIG. 1, the gas segregator barrier 2 includes a plurality of substantially parallel segregator fins 4 to segregate the ionized gases 65 discharged from the exhaust vent openings 54A,54B. A transverse dividing member 6 (best shown in FIG. 2) divides the substantially parallel segregator fins 4 into a first portion 8 and a second portion 10 (FIG. 2). A plurality of exhaust channels, for example, first, second and third exhaust channels 12,14,16 are formed between the substantially parallel segregator fins 4 of the first portion 8.

The discharged ionized gases 65 are hot and electrically conductive. The exhaust channels 12,14,16 segregate each pair of opposing poles, for example, corresponding first poles 56A,56B, from adjacent pairs of opposing poles, for example, corresponding second poles 58A,58B. Hence, this minimizes the likelihood of a phase-to-phase electrical failure between adjacent poles carrying current of a different electrical phase. The transverse dividing member 6 includes a plurality of baffles 24 structured to quench or reduce the temperature of the discharged ionized gases 65, thereby decreasing electrical conductivity and the likelihood of an electrical fault associated therewith. In the example of FIG. 1, each of the first, second and third exhaust channels 12,14,16 includes one baffle 24 comprising a plurality of openings 26 extending through the transverse dividing member 6. The exemplary baffles 24 are staggered within the gas segregator barrier 2, with the baffle 24 of first exhaust channel 12 being located proximate first pole 56A, the baffle 24 of second exhaust channel 14 being located centrally between opposing second poles 58A,58B, and the baffle 24 of the third exhaust channel 16 being located proximate third pole 60B.

As shown in FIG. 1, the exemplary gas segregator barrier 2 is structured for disposition between the pair of spaced-apart circuit breakers 50A,50B, with each of the first, second and third exhaust channels 12,14,16 being proximate the pair of exhaust vent openings 54A,54B for each corresponding pair of opposing poles 56A,56B; 58A,58B; 60A,60B (see, for example, first exhaust channel 12 extending between the exhaust vent opening 54A of first pole 56A and the exhaust vent opening 54B of the corresponding opposing first pole 56B).

As shown in FIG. 2, the substantially parallel segregator fins 4 of the gas segregator barrier 2 are separated into a first portion 8 and a second portion 10 by the transverse dividing member 6. A number of gas ducts, for example, 18,20,22 corresponding to the exhaust channels, for example 12,14,16 of the first portion 8, are disposed between the substantially parallel segregator fins 4 of the second portion 10. Each gas duct, for example, first gas duct 18, includes one or more lateral members 30 integral with and extending between a pair of adjacent, substantially parallel segregator fins 4. The lateral members 30 are structured to controllably direct the discharged ionized gases 65 to gust in a predetermined direction (see, for example, ionized gases 65 being controllably directed by lateral member 30 of first gas duct 18, to gust laterally, as indicated by the arrow in FIG. 2).

Figure 3:
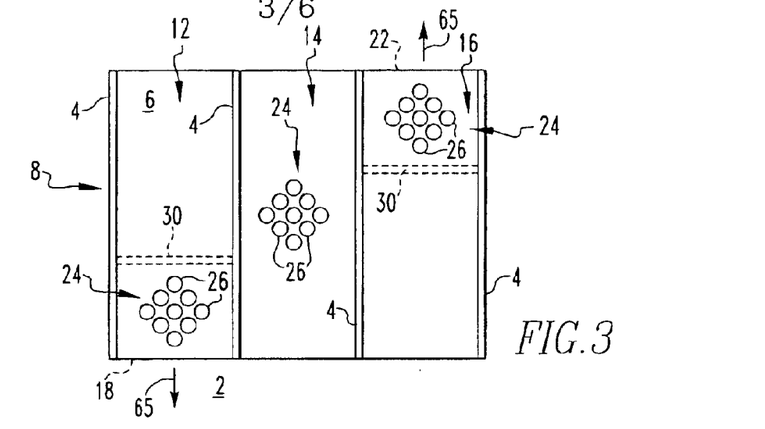
FIG. 3 is a plan view of the gas segregator barrier of FIG. 2.
Figure 4:
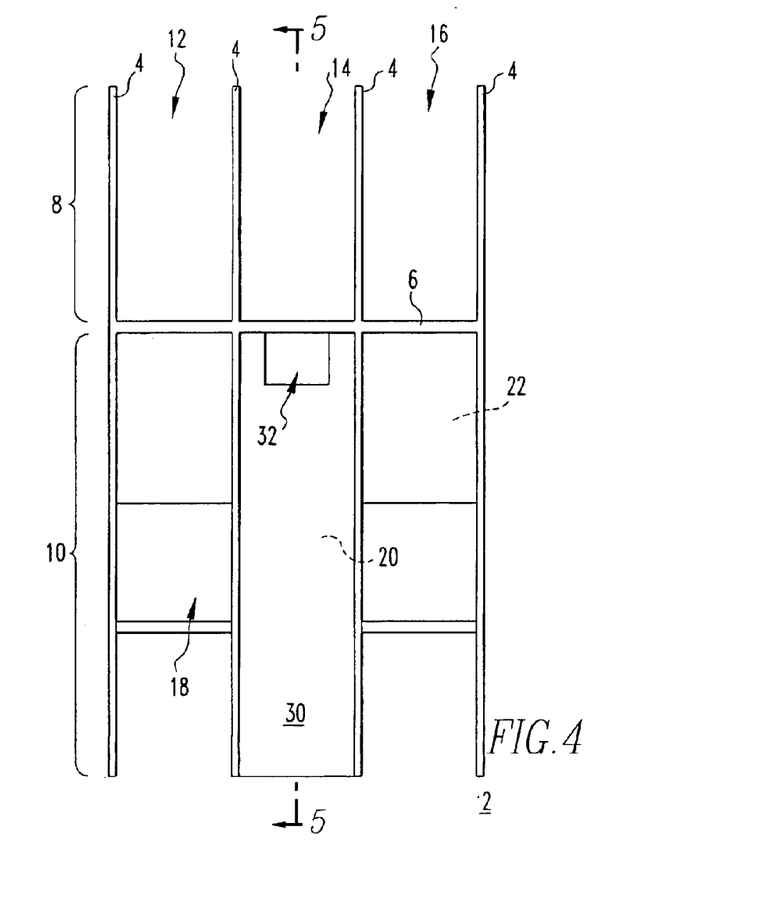
FIG. 4 is a vertical elevation view of the gas segregator barrier of FIG. 2.
Figure 5:
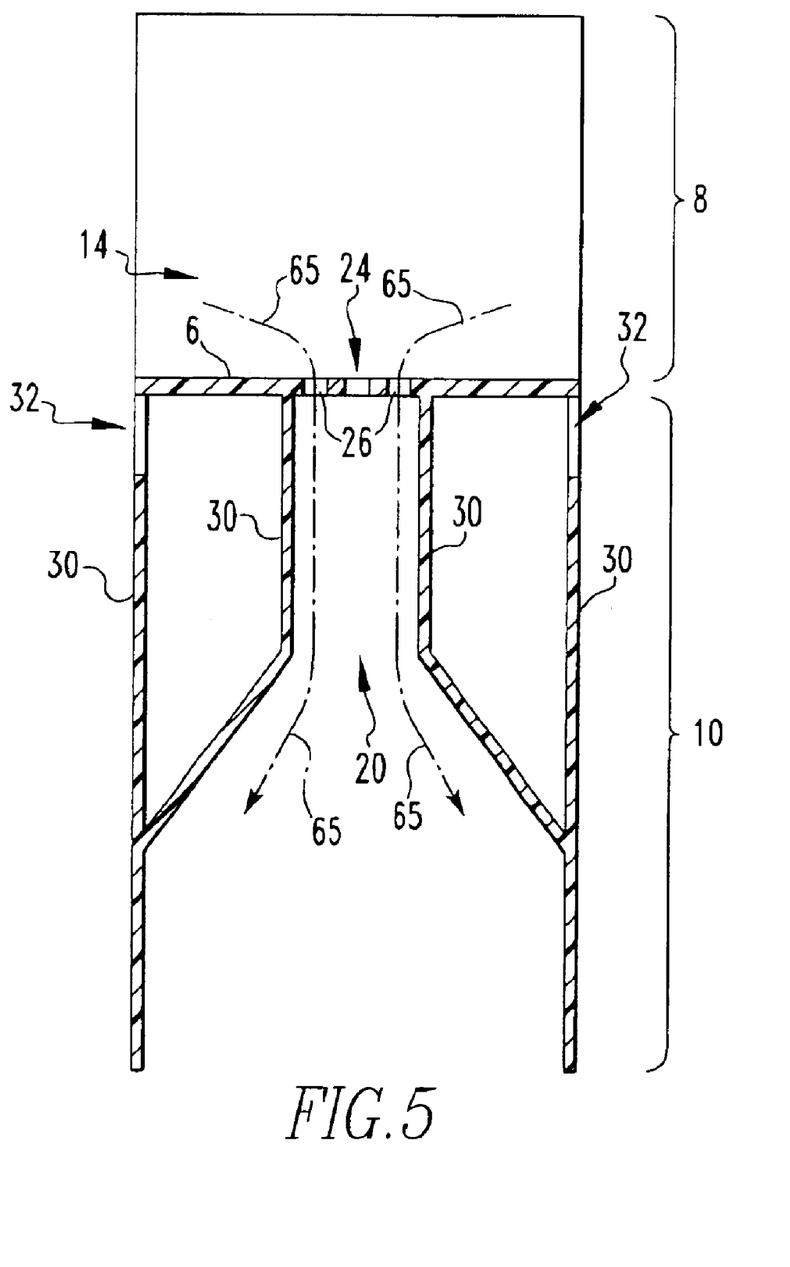
FIG. 5 is a sectional view taken along line 5—5 of FIG. 4.
Figure 8:
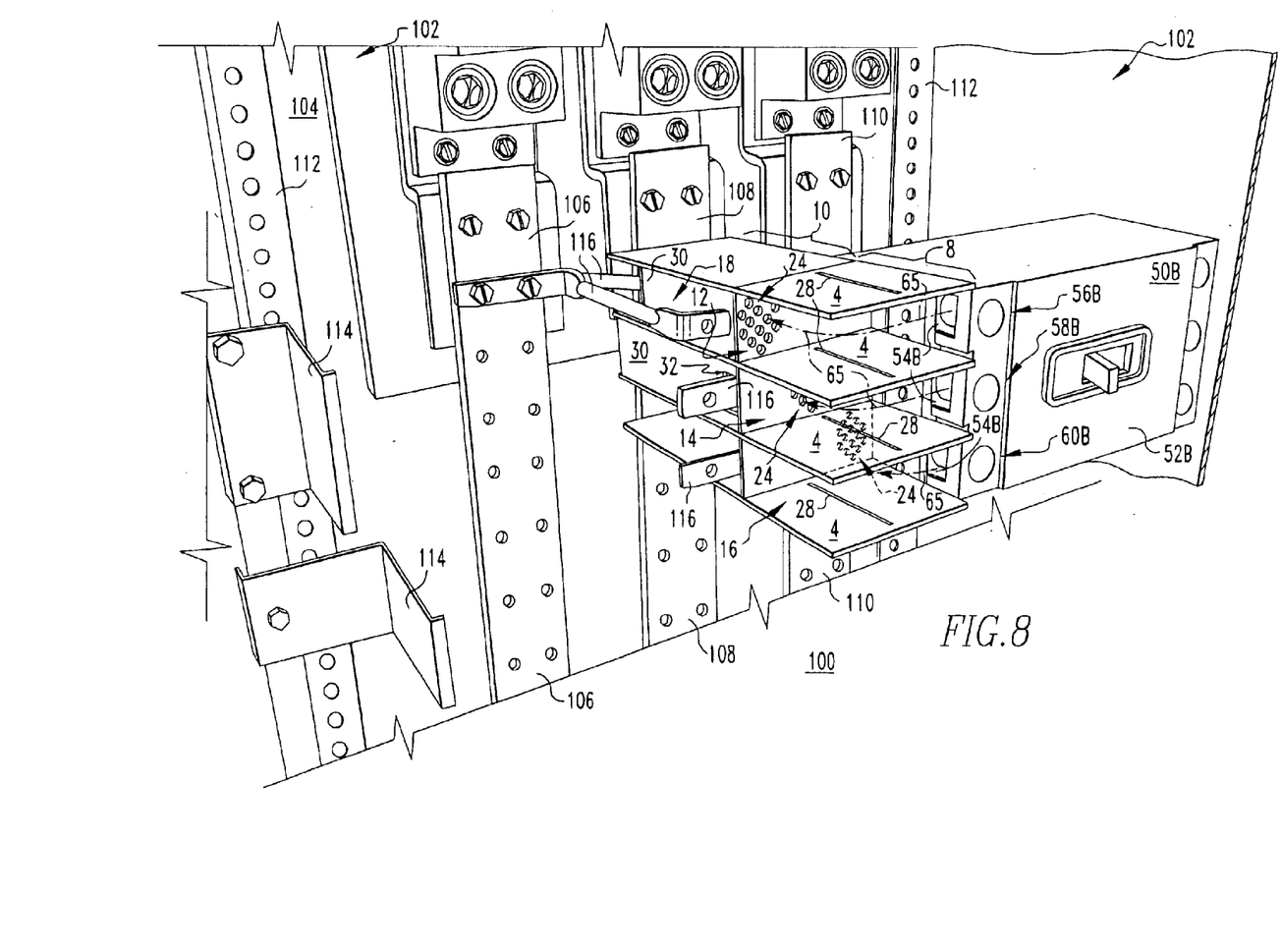
FIG. 8 is an isometric view of a panelboard assembly employing the gas segregator barrier of FIG. 1, with some of the circuit breakers removed therefrom.

As shown in FIGS. 2-5, the outer, first gas duct 18 and the third gas duct 22 are structured to controllably direct ionized gases 65 to gust laterally away from the gas segregator barrier 2 onto corresponding first and third elongated bus bars 106 and 110, respectively (FIG. 8), and branch strap connectors 116 (FIG. 8) carrying current of corresponding first and third electrical phases. The central second gas duct 20 is structured to controllably direct discharged ionized gases 65 downward (FIG. 5), onto the second elongated bus bar 108 (FIG. 8) and branch strap connectors 116 carrying current of a corresponding second electrical phase (FIG. 8). One or more of the lateral members 30 include an opening 32 such as, for example, the openings 32 in each of the lateral members 30 of the second gas duct 20 in FIG. 2 (see also the lateral member 30 of the second gas duct 20 on the other side of gas segregator barrier 2, shown in FIG. 8). The lateral members 30 are structured to receive at least a portion of a branch strap connector 116 (best shown in FIG. 8). The baffles 24 in the transverse dividing member 6 provide fluid communication between the first, second and third exhaust channels 12,14,16 and corresponding first, second and third gas ducts 18,20,22, respectively. In operation, as illustrated in FIGS. 2 and 5, discharged ionized gases 65 are quenched or cooled as they pass from an exhaust channel, for example, first exhaust channel 12, through the baffle openings 26 and into the gas duct, for example, first gas duct 18. The discharged ionized gases 65 are then controllably directed by one or more lateral members 30 to gust in a predetermined direction (see discharged ionized gases 65 being controllably directed to gust laterally by lateral member 30 of first gas duct 18, in FIG. 2).

FIG. 3 illustrates the first portion 8 of the gas segregator barrier 2. As shown, the exemplary gas segregator barrier 2 includes four substantially parallel segregator fins 4 forming three exhaust channels 12,14,16 therebetween. However, it will be appreciated that any number of parallel or substantially parallel segregator fins 4 may be employed forming exhaust channels therebetween. It will also be appreciated that segregator fins need not be substantially parallel, but may be arranged in any number of alternative configurations (not shown). The exemplary exhaust channels 12,14,16 include one baffle 24 comprising a plurality of openings 26 through the transverse dividing member 6. However, any number of baffles 24 comprising a variety of temperature reduction mechanisms other than the exemplary openings 26, could be employed in any position within the exhaust channels 12,14,16. For example, an elongated slot 28 (FIG. 8) may optionally be included within the segregator fins 4 of the exhaust channels 12,14,16, in order to baffle the discharged ionized gases 65.

Continuing to refer to FIG. 3, the lateral members 30 (shown in phantom line drawing) extending between the substantially parallel segregator fins 4 of the second portion 10 (best shown in FIG. 4), in order to form corresponding gas ducts 18,20,22 beneath each baffle 24. The lateral members 30 of the exemplary first and third gas ducts 18 and 22 are structured to controllably direct the discharged ionized gases 65 laterally as indicated by the arrows in FIG. 3. However, it will be appreciated that any number of lateral members 30 may be employed to controllably direct discharged ionized gases 65 to gust in any desired direction.

FIG. 4 shows the exemplary first portion 8 and second portion 10 separated by the dividing member 6 to form first, second and third exhaust channels 12,14,16 between the segregator fins 4 of such first portion and corresponding first, second and third gas ducts 18,20,22 between the segregator fins 4 of such second portion. As shown, the second gas duct 20 includes two lateral members 30 (see FIG. 2 showing the lateral member 30 of one side of segregator barrier 2 and FIG. 8 showing the lateral member 30 on the other side of the segregator barrier 2), structured to controllably direct discharged ionized gases 65 (FIG. 5) to gust downward onto a branch strap connector 116 (FIG. 8) carrying current of a corresponding second electrical phase in bus bar 108 (FIG. 8). The lateral members 30 of the second gas duct 20 also provide additional electrical isolation of the discharged ionized gases 65 (FIG. 5) from the adjacent first and third elongated bus bars 106,110 (FIG. 8). The lateral members 30 of the exemplary second gas duct 20 each include one opening 32 to receive a portion of the branch strap connector 116 (FIG. 8) therethrough. However, it will be appreciated that each lateral member 30 could include more than one opening 32 to accommodate more than one branch strap connector 116 (not shown), or alternatively may include no openings at all.

FIG. 5 shows the second gas duct 20 in greater detail. As indicated by the arrows, the exemplary second gas duct 20 of the second portion 10 includes two lateral members 30 structured to controllably direct the discharged ionized gases 65 downward onto a branch strap connector 116 (FIG. 8) and the second elongated bus bar 108 (FIG. 8) carrying current of a corresponding second electrical phase. As discussed above, the baffle 24 for the second gas duct 20 is located in the center of the second exhaust channel 14 and includes a plurality of openings 26 extending through the transverse dividing member 6 to provide fluid communication between the second exhaust channel 14 of the first portion 8 and the second gas duct 20 of the second portion 10.

Figure 6:
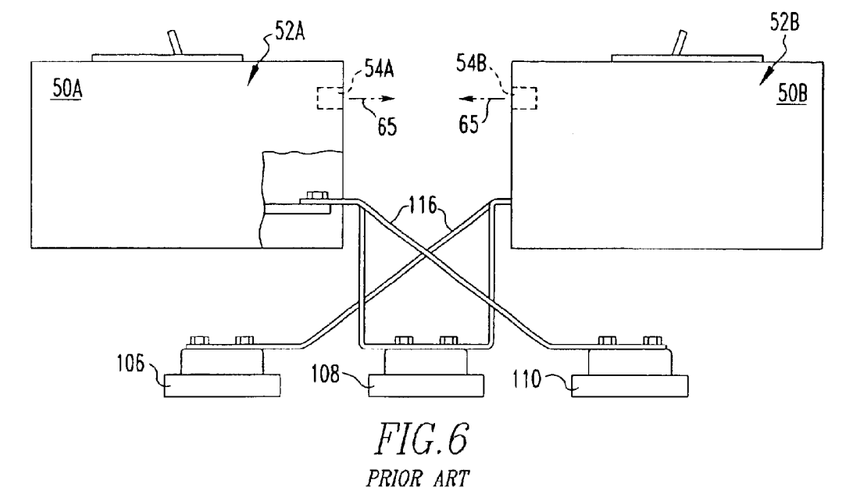
FIG. 6 is a bottom plan view of two interconnected circuit breakers, with a portion of one circuit breaker cut-away to show internal structures.

FIG. 6 shows a pair of spaced-apart circuit breakers 50A,50B coupled in double-branch configuration before employing the gas segregator barrier 2 of the present invention. As shown, each circuit breaker 50A,50B includes a housing 52A,52B having exhaust vent openings 54A,54B to discharge ionized gases 65 generated within one of the housings 52A,52B as the result of an overload, short circuit or fault electrical condition. The circuit breakers 50A,50B are electrically connected to first, second and third parallel or substantially parallel elongated bus bars 106,108,110 by a plurality of branch strap connectors 116. Each of the elongated bus bars 106,108,110 carries current of a different electrical phase. Each pair of opposing poles 56A,56B; 58A,58B; 60A,60B (FIG. 1) of the spaced-apart circuit breakers 50A,50B is electrically connected by branch strap connectors 116 to an elongated bus bar carrying current of the same electrical phase (see FIG. 8 wherein branch strap connectors 116 are structured to electrically connect opposing first poles 56A (removed for ease of illustration) and 56B to first elongated bus bar 106 carrying electrical current of a corresponding first electrical phase).

Figure 7:
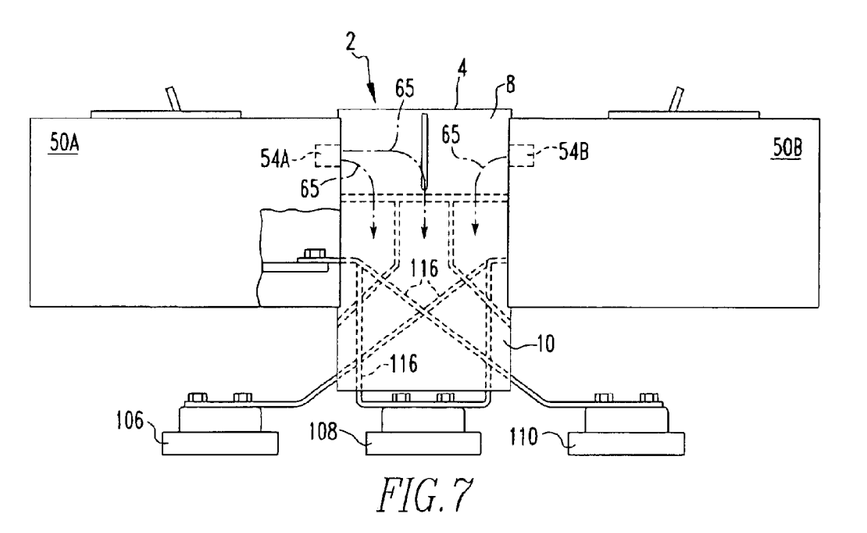
FIG. 7 is a bottom plan view of two interconnected circuit breakers and the gas segregator barrier of FIG. 1, with a portion of one circuit breaker cut-away to show internal structures.

FIG. 7 shows a pair of spaced-apart circuit breakers 50A,50B electrically connected in double-branch configuration and employing the gas segregator barrier 2 therebetween. As employed, the gas segregator barrier 2 is disposed between the pair of circuit breakers 50A,50B, in order that each of the exhaust channels 12,14,16 (FIG. 1) of the first portion 8 is proximate the exhaust vent openings 54A,54B for a corresponding pair of opposing poles 56A,56B; 58A, 58B; 60A,60B (FIG. 1). The second portion 10 covers and provides electrical insulation between branch strap connectors 116 carrying current of different first, second and third electrical phases and electrically connecting the circuit breakers 50A,50B to corresponding first, second and third elongated bus bars 106,108,110. As discussed above, gas ducts 18,20,22 (best shown in FIGS. 2–5) formed between the substantially parallel segregator fins 4 of the second portion 10 are structured to controllably direct discharged ionized gases 65 to gust only onto a branch strap connector 116 or an elongated bus bar 106,108,110 carrying current of the same electrical phase as the pole from which the ionized gases 65 were discharged.

FIG. 8 shows the panelboard assembly 100 with one of the spaced-apart circuit breakers 50A (FIG. 1) removed from the switchgear cabinet 102, for ease of illustration. As shown, first, second and third elongated bus bars 106,108, 110 are mounted in a substantially parallel array to the support wall 104 of the switchgear cabinet 102. Mounting tabs 114 are structured to secure the circuit breakers 50A, 50B to mounting rails 112 (see, for example, mounting tabs 114 structured to secure removed circuit breaker 50A (FIG. 1), in FIG. 8). The line terminals (not shown) of the poles of each circuit breaker such as, for example, first, second and third poles 56B,58B,60B of circuit breaker 50B, are electrically connected to the first, second and third elongated bus bars 106,108,110 by branch strap connectors 116 (see, for example, first pole 56B electrically coupled to first elongated bus bar 106 by branch strap connector 116, in FIG. 8). Each corresponding opposing pole 56A,58A,60A (FIG. 1) of the other spaced-apart circuit breaker (see circuit breaker 54A, in FIG. 1) is also connected through line terminals (not shown) to the same elongated bus bar (see, for example, the branch strap connectors 116 attached to first elongated bus bar 106 electrically connecting first pole 56B and structured to also electrically connect first pole 56A of removed circuit breaker 50A (FIG. 1), in FIG. 8). As shown, the circuit breaker housing 52B includes a plurality of exhaust vent openings 54B for each of the poles 56B,58B,60B of the circuit breaker 50B. First, second and third exhaust channels 12,14,16 formed between the substantially parallel segregator fins 4 of the first portion 8 align with these exhaust vent openings 54B.

As employed, for example, when circuit breaker 50B is experiencing a severe over current fault condition, the ionized gases 65 are discharged from the exhaust vent opening 54B of a pole, for example, first pole 56B, down the corresponding first exhaust channel 12, through the baffle 24 and onto a branch strap connector 116 isolated within the first gas duct 18, in order that the ionized gases 65 carrying current of a first electrical phase are controllably directed by lateral member 30 to gust only onto the first elongated bus bar 106 which carries current of a corresponding first electrical phase. Similarly, ionized gases 65 discharged from the exhaust vent opening 54B of the second pole 58B are discharged down the second exhaust channel 14 through the baffle 24, located centrally within the second exhaust channel 14, and then controllably directed by the lateral members 30 of the second gas duct 20 (best shown in FIG. 5) to gust downward onto a branch strap connector 116 carrying current of a corresponding second electrical phase for transmission to the second elongated bus bar 108. Ionized gases 65 discharged from exhaust vent opening 54B of third pole 60B gust within exhaust channel 16, down through the baffle 24, located at the end of the exhaust channel 16 proximate third pole 60B, and are controllably directed by the lateral member 30 of third gas duct 22 (FIG. 2) to gust laterally onto a branch strap connector 116 electrically connected to the third elongated bus bar 110 carrying current of a corresponding third electrical phase.

As shown in FIG. 8, for illustrative clarity, spaced-apart circuit breaker 50A was removed. However, it will be appreciated that ionized gases 65 discharged from one of the opposing first, second and third poles 56A,58A,60A thereof, would be segregated, quenched and controllably directed in much the same manner as the ionized gases 65 discharged from circuit breaker 50B as described above.

It will also be appreciated that although the circuit breakers 50A,50B are three-pole circuit breakers having three pairs of opposing poles 56A,56B; 58A,58B; 60A,60B and the gas segregator barrier 2 includes four substantially parallel segregator fins 4 forming three exhaust channels 12,14,16, circuit breakers having any number of poles may be employed with a gas segregator 2 having corresponding exhaust channels disposed therebetween.

The exemplary gas segregator barrier 2 is made from an electrically isolating material such as, for example, thermoplastic. However, it will be appreciated that any suitable, electrically insulating material could be used.

The gas segregator barrier 2 is structured for integral attachment within a panelboard assembly 100, thus permitting it to remain in place while replacing or exchanging switchgear such as, for example, circuit breakers.

Accordingly, the gas segregator barrier 2 of the present invention provides an effective, efficient, and economic way to effectively reduce electrical faults associated with hot, conductive ionized gases discharged from one of the spaced-apart circuit breakers, for example 50A,50B, double-branch mounted within a panelboard assembly 100.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only, and not limiting as to the scope of the invention which is to given the full breadth of the claims appended and any and all equivalents thereof.

What is claimed is:

1. A gas segregator barrier for electrical switching apparatus including a housing having at least one exhaust vent opening for discharging ionized gases which are developed in response to an electrical fault, said gas segregator barrier comprising:

a plurality of at least substantially parallel segregator fins;

a transverse dividing member structured to divide said substantially parallel segregator fins into a first portion and a second portion;

a plurality of exhaust channels formed between said substantially parallel segregator fins of said first portion;

a plurality of gas ducts disposed between said substantially parallel segregator fins of said second portion; and a plurality of baffles in said dividing member structured to quench said discharged ionized gases and to provide fluid communication between the exhaust channels of said first portion and the gas ducts of said second portion; and wherein said electrical switching apparatus is a pair of spaced-apart circuit breakers, each of said spaced-apart circuit breakers having a plurality of poles, with each of said poles of one of said spaced-apart circuit breakers having a corresponding opposing one of said poles on the other one of said spaced-apart circuit breakers; wherein said at least one exhaust vent opening is a plurality of exhaust vent openings, with each of said exhaust vent openings for a corresponding one of said poles; and wherein said gas segregator barrier is structured for disposition between said pair of spaced-apart circuit breakers, with each of said exhaust channels being proximate a pair of said exhaust vent openings for a corresponding pair of the opposing poles of said spaced-apart circuit breakers.

* * * * *